Figure 1:
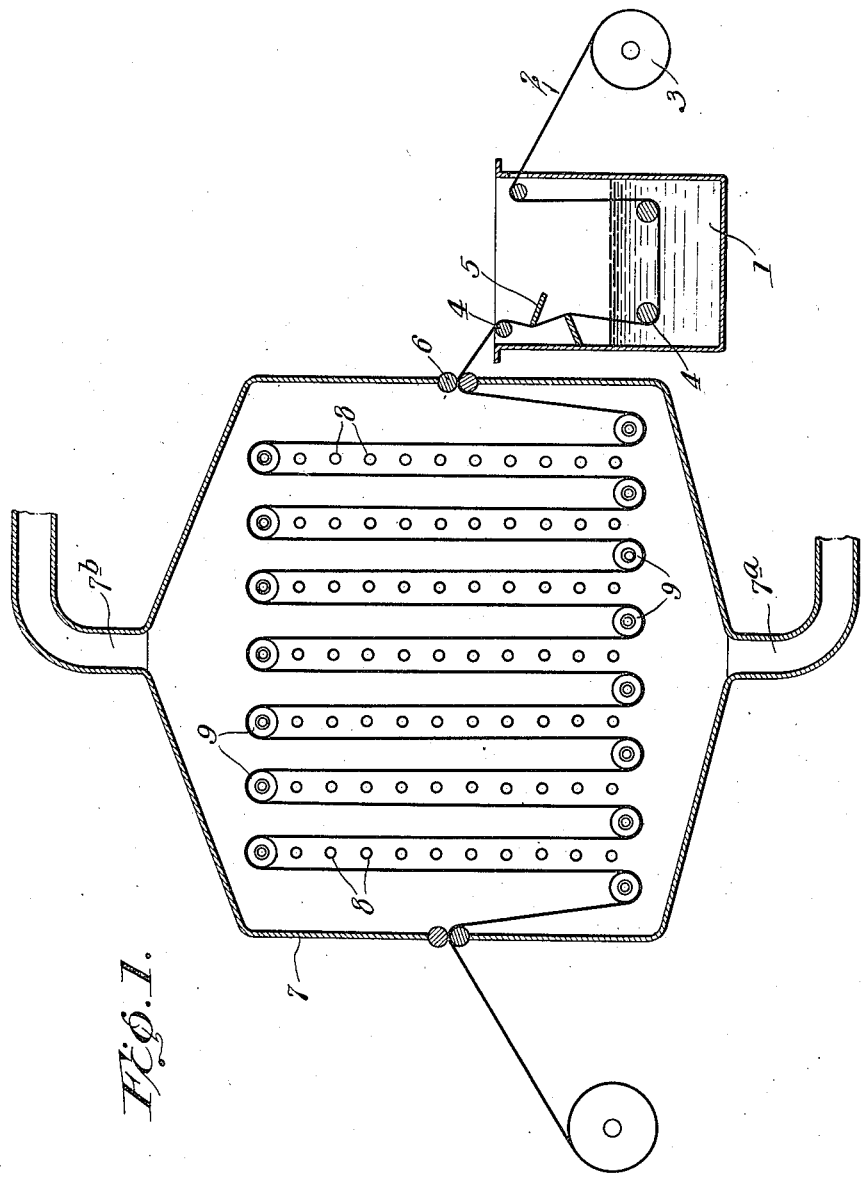

I. W. ROBERTSON.
CORD FABRIC IMPREGNATING APPARATUS.
APPLICATION FILED APR. 5, 1921.

1,413,786. Patented Apr. 25, 1922.
2 SHEETS—SHEET 1.

Inventor:
Isaac W. Robertson,
By Middleton Donaldson & Hall
Attorneys,

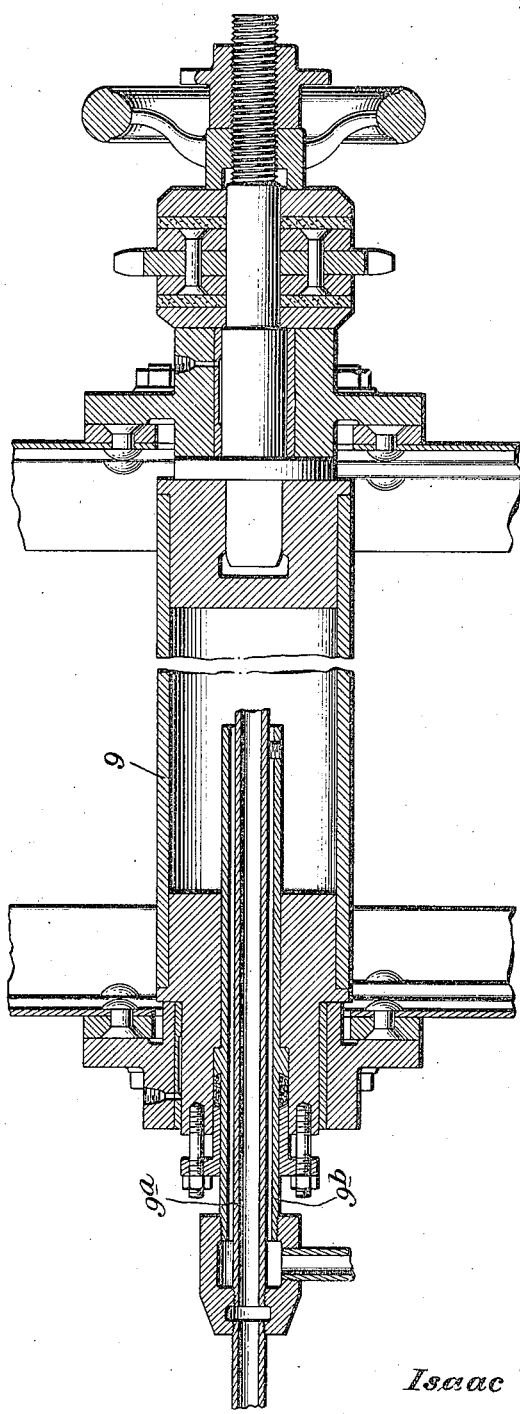

UNITED STATES PATENT OFFICE.

ISAAC W. ROBERTSON, OF AKRON, OHIO, ASSIGNOR TO THE MILLER RUBBER COMPANY, A CORPORATION OF OHIO.

CORD-FABRIC-IMPREGNATING APPARATUS.

1,413,786.   Specification of Letters Patent.   Patented Apr. 25, 1922.

Application filed April 5, 1921. Serial No. 458,839.

*To all whom it may concern:*

Be it known that I, ISAAC W. ROBERTSON, a citizen of the United States, and resident of Akron, county of Summit, State of Ohio, have invented certain new and useful Improvements in Cord - Fabric - Impregnating Apparatus, of which the following is a specification.

My present invention relates to an improved method of and apparatus designed for evaporating the volatile solvent from webs saturated with material dissolved in such solvent, and is designed more especially for the treatment of fabrics such as used for building cord tires where the fabric is passed through a solution of rubber gum in a volatile solvent, which solvent is evaporated leaving the gum on and in the fabric.

It has been customary to pass such coated fabrics through a closed chamber in proximity to heating elements which evaporate or volatilize the solvent, the vapors of which are drawn off and condensed, and the fabric is guided in its passage in proximity to the heating elements by guide rollers. Much difficulty has been experienced with such apparatus by reason of the fact that the gum tends to adhere to and build upon the rollers, thus detracting from the proper coating of the fabric, and also interfering with the proper action of the apparatus, requiring its stoppage and the opening of the chamber and the scraping of the accumulated coatings from the rollers, which is a tedious and troublesome job and results in loss of solvent. As the gum removed could not be reused this material was a further loss.

These defects are avoided by the present invention as I have discovered that if the guides or rolls are cooled sufficiently below the temperature of the evaporator chamber, some of the solvent will condense on the exposed surface of the rolls or guides and make them solvent moistened which has the effect of preventing the gum from adhering to the rolls.

The invention therefore includes the novel process and apparatus hereinafter described and particularly defined by the appended claims.

My invention will be better understood by reference to the accompanying drawing in which Figure 1 is a sectional elevation of a diagrammatic nature showing a coating and evaporating apparatus.

Fig. 2 is a sectional detail of one of the rolls.

Referring by reference characters to this drawing the numeral 1 designates a solution tank for a mixture of gum and volatile solvent through which the web of fabric 2 is passed from a supply roll 3, around suitable guide rollers 4 so as to be coated or impregnated in the usual manner, the surplus material being removed by scrapers 5.

The web is then passed through sealing rollers 6, into a closed evaporating chamber 7 which has an outlet 7$^a$ at one point, for example the bottom, for withdrawal of solvent vapors which are passed to a condenser (not shown) provision being made for return of any uncondensed vapors at inlet connection 7$^b$. Within the chamber are arranged a series of rows of heaters 8 which may conveniently be in the shape of steam heated pipes or radiators and the web is caused to take a volute or zigzag path past the surface of these radiators by means of guide rollers 9. These rollers are of metal and are made hollow and are kept supplied, by flow and return pipes 9$^a$ and 9$^b$, with a cooling fluid, preferably water. The supply pipes are all connected in any suitable manner to the source of supply, and are preferably projected axially through one end of the roll to near the opposite end thereof so that the cooling water is obliged to travel the full length of the roll before escaping through the annular passage formed between the flow and return pipes.

The return pipes may all be connected to a common source of discharge.

It will be seen that a portion of each roll is always exposed and I have found that by keeping the rolls cool the volatilized solvent will condense sufficiently on the exposed portions of the rolls to prevent any of the gum from adhering thereto.

The rolls may, of course, be driven in any suitable manner, but as this forms no part of the present invention, description thereof is deemed unnecessary.

Having thus described my invention, what I claim is:

1. The herein described method of evaporating the solvent from a web saturated or coated with a gum dissolved in a volatile liquid which consists in passing said fabric over suitable guides in an evaporating chamber, and maintaining said guides at a temperature below that of the chamber to cause condensation of the solvent thereon.

2. The herein described method of evaporating solvent from a coated or impregnated web which consists in passing said web in a volute like path in proximity to heating elements, and guiding said web during such path by the use of rollers cooled to a temperature sufficient to cause solvent to be condensed thereon.

3. The herein described step in the method of evaporating solvent from treated webs which consists in passing said webs over rollers having their surfaces at a temperature low enough to cause condensation of solvent thereon.

4. Apparatus for evaporating the solvent from webs treated with gum dissolved in a volatile solvent comprising a plurality of heating elements, guides for passing the web successively in proximity to said heating elements, and means for cooling said guides.

5. In apparatus of the class described rollers arranged to cause passage of a web in a volute like path, heating elements for evaporating the solvent from said web and means for cooling said guides to effect condensation of solvent thereon.

6. In apparatus of the class described an evaporating chamber, a plurality of rows of heating elements therein, guide rollers arranged at opposite ends of said rows of heating elements, and means for cooling said guide rollers.

In testimony whereof I affix my signature.

ISAAC W. ROBERTSON.